(12) United States Patent  
Jeong et al.

(10) Patent No.: US 9,736,208 B2
(45) Date of Patent: Aug. 15, 2017

(54) METHOD AND APPARATUS FOR SHARING MEDIA BASED ON SOCIAL NETWORK IN COMMUNICATION SYSTEM

(75) Inventors: Jin-Guk Jeong, Yongin-si (KR); Sun-Hee Youm, Gangdong-gu (KR); Mi-Hwa Park, Anyang-si (KR); Hyun-Sik Shim, Yongin-si (KR); Soo-Hong Park, Yongin-si (KR); Min-Ho Lee, Gwacheon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 13/411,384

(22) Filed: Mar. 2, 2012

(65) Prior Publication Data

US 2012/0226752 A1   Sep. 6, 2012

(30) Foreign Application Priority Data

Mar. 2, 2011 (KR) .................. 10-2011-0018457

(51) Int. Cl.
*G06F 15/16* (2006.01)
*H04L 29/08* (2006.01)
(Continued)

(52) U.S. Cl.
CPC ............. *H04L 67/02* (2013.01); *H04W 4/206* (2013.01); *H04W 4/02* (2013.01)

(58) Field of Classification Search
CPC . H04L 67/02; H04L 65/1006; H04L 65/1016; H04L 65/1069; H04L 67/18;
(Continued)

(56) References Cited

U.S. PATENT DOCUMENTS 7,917,154 B2   3/2011  Fortescue et al.
2005/0021665 A1*  1/2005  Sekimoto et al. ............ 709/217
(Continued)

FOREIGN PATENT DOCUMENTS

CN     101552800 A    10/2009
CN     101924674      12/2010
(Continued)

OTHER PUBLICATIONS

International Search Report dated Sep. 27, 2012 in connection with International Patent Application No. PCT/KR2012/001390, 3 pages.
(Continued)

*Primary Examiner* — Thao Duong

(57) ABSTRACT

A method and an apparatus for sharing media using a social network in a communication system are provided. A method of a transmit terminal for sharing media using a social network includes transmitting to a media server, identification information relating to at least one counterpart terminal, generating media comprising location information associated with the media, and registering the generated media to the media server. A method of a receive terminal for sharing media using a social network includes transmitting to a media server, identification information relating to at least one counterpart terminal, transmitting location information of the receive terminal to the media server, and receiving from the media server, media corresponding to the location information among media registered by the at least one counterpart terminal.

10 Claims, 11 Drawing Sheets

(51) Int. Cl.
 *H04W 4/20* (2009.01)
 *H04W 4/02* (2009.01)

(58) Field of Classification Search
 CPC ..... H04L 67/22; H04L 12/66; H04L 41/0853;
 H04L 51/32; H04L 67/306; H04L 65/403;
 H04L 67/10; H04L 67/06; H04L 12/588;
 H04L 51/20; H04L 63/10; H04L 65/4084;
 G06F 17/30038; G06F 17/30241; G06F
 17/30053
 USPC ....... 709/203, 212, 213, 216, 217, 219, 231,
 709/232
 See application file for complete search history.

(56) References Cited

U.S. PATENT DOCUMENTS

| | | | |
|---|---|---|---|
| 2007/0206101 A1 | 9/2007 | Ueno et al. | |
| 2007/0214180 A1 | 9/2007 | Crawford | |
| 2007/0217676 A1* | 9/2007 | Grauman | G06K 9/4671 382/170 |
| 2007/0287441 A1 | 12/2007 | Im et al. | |
| 2008/0040475 A1* | 2/2008 | Bosworth et al. | 709/224 |
| 2008/0065774 A1* | 3/2008 | Keeler | 709/227 |
| 2008/0248815 A1* | 10/2008 | Busch | 455/456.5 |
| 2009/0013413 A1* | 1/2009 | Vera et al. | 726/30 |
| 2009/0100134 A1 | 4/2009 | Svennarp | |
| 2009/0164459 A1 | 6/2009 | Jennings et al. | |
| 2009/0271247 A1 | 10/2009 | Karelin et al. | |
| 2010/0036912 A1 | 2/2010 | Rao | |
| 2010/0100937 A1 | 4/2010 | Tran | |
| 2010/0131385 A1 | 5/2010 | Harrang et al. | |
| 2010/0293255 A1 | 11/2010 | Hara et al. | |
| 2010/0315433 A1 | 12/2010 | Takeshita | |
| 2010/0318571 A1* | 12/2010 | Pearlman et al. | 707/784 |
| 2011/0072107 A1* | 3/2011 | Gutta et al. | 709/217 |
| 2011/0072114 A1* | 3/2011 | Hoffert et al. | 709/219 |
| 2011/0083101 A1* | 4/2011 | Sharon et al. | 715/800 |
| 2011/0279311 A1* | 11/2011 | Hamano | 342/357.25 |

FOREIGN PATENT DOCUMENTS

| | | |
|---|---|---|
| JP | 2005-062952 | 3/2005 |
| JP | 2007-213385 | 8/2007 |
| JP | 2008-507751 | 3/2008 |
| JP | 2008-171068 | 7/2008 |
| JP | 2009-301213 | 12/2009 |
| JP | 2010-136191 | 6/2010 |
| JP | 2010-287059 | 12/2010 |
| JP | 2012-530321 | 11/2012 |
| KR | 10-2004-0100418 | 12/2004 |
| KR | 10-2010-0125561 | 12/2010 |
| WO | WO 2009/096015 | 8/2009 |
| WO | WO 2010/147828 | 12/2010 |

OTHER PUBLICATIONS

Written Opinion of International Searching Authority dated Sep. 27, 2012 in connection with International Patent Application No. PCT/KR2012/001390, 6 pages.
Patent Examination Report No. 1 dated Oct. 8, 2015 in connection with Australian Patent Application No. 2012-223882; 3 pages.
Chinese Office Action and English translation issued for Chinese Patent Application No. CN 201280011226.0 dated Jan. 28, 2016, 15 pgs.
English translation of Japanese Office Action issued for Japanese Patent Application No. JP 2013-556541 dated Dec. 21, 2015, 3 pgs.
Examination Report No. 2 dated May 10, 2016 in connection with Australian Patent Application No. 2012223882, 3 pages.
Decision of Rejection dated Jul. 4, 2016 in connection with Japanese Patent Application No. JP 2013-556541, 6 pages.
Australian Government—IP Australia, "Patent Examination Report No. 3," Application No. 2012223882, Sep. 1, 2016, publisher IP Australia, Melbourne, Australia.
Australian Government—IP Australia, "Notice of Acceptance," Application No. 2012223882, Sep. 30, 2016, publisher IP Australia, Melbourne, Australia.
Notification of Second Office Action issued for Application No. 201280011226.0 dated Oct. 17, 2016, 12 pages.
Korean Intellectual Patent Office, "Notice of Preliminary Rejection," Application No. 10-2011-0018457, Nov. 21, 2016, 8 pages, publisher KIPO, Daejeon, Republic of Korea.
Extended European Search Report dated Jul. 2, 2014 in connection with European Application No. 12752480.9, 5 pages.
Foreign Communication from Related Counterpart Application, Chinese Patent Application No. 201280011226.0, Decision of Rejection dated Feb. 27, 2017.
Foreign Communication from Related Counterpart Application, European Patent Application No. 12752480.9, Office Action dated Mar. 6, 2017, 4 pages.
Foreign Communication from Related Counterpart Application, Korean Patent Application No. 10-2011-0018457, Notice of Patent Grant dated Apr. 27, 2017, 4 pages.

* cited by examiner

METHOD AND APPARATUS FOR SHARING MEDIA BASED ON SOCIAL NETWORK IN COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Mar. 2, 2011, and assigned Serial No. 10-2011-0018457, the entire disclosure of which is hereby incorporated by reference.

TECHNICAL FIELD OF THE INVENTION

The present invention relates generally to communication systems, and more particularly, to a method and an apparatus for sharing media based on a social networks in a communication system.

BACKGROUND OF THE INVENTION

A social network generally includes a network of individuals forming an association with one another based on his/her identity. Social networks may have different features according to differing characteristics and interest of their constituent members. In some respects, the social network may be regarded to a relatively high level due to the fact that humans living in social relationships may be affected by valuation and personal connections of the individual in his/her life. Also, social network are generally becoming more popular as a useful means for building new relationships for individuals.

However, conventional social network services often merely function to transmit and receive messages based on the established network between user terminals, and thus may not satisfy user's demand for various services.

SUMMARY OF THE INVENTION

To address the above-discussed deficiencies of the prior art, it is a primary aspect of the present invention to provide a method and an apparatus for sharing media based on a social network in a communication system.

Another aspect of the present invention is to provide a method and an apparatus for sharing media based on location information of related terminals by generating media that includes the location information associated with the terminals of a communication system.

Yet another aspect of the present invention is to provide a method and an apparatus for adding metadata to media files indicating location information and sensor information of media files and sharing the media files using the metadata in a communication system.

Still another aspect of the present invention is to provide a method and an apparatus for dividing media to a plurality of segments based on a certain base, adding metadata to media file indicating location information and sensor information for the divided segments, and sharing the media files based on the metadata in a communication system.

According to one aspect of the present disclosure, a method of a communication terminal for sharing media using a social network is provided. The method comprises transmitting to a media server, identification information relating to at least one counterpart terminal, generating media comprising location information associated with the media, and registering the generated media to the media server.

According to another aspect of the present disclosure, a method of a communication terminal for sharing media using a social network is provided. The method comprises transmitting to a media server, identification information relating to at least one counterpart terminal, transmitting location information of the receive terminal to the media server, and receiving from the media server, media corresponding to the location information that is registered by the at least one counterpart terminal.

According to another aspect of the present disclosure, a method of a media server for sharing media between terminals using a social network is provided. The method is comprises receiving from each terminal, identification information of at least one counterpart terminal related and building a social network for each terminal, receiving and registering media comprising location information associated with each terminal, receiving location information from a particular terminal, searching for media corresponding to the location information that is registered by at least one counterpart terminal belonging to the social network of the particular terminal, and transmitting the searched media to the particular terminal.

According to another aspect of the present disclosure, a transmit terminal for sharing media using a social network is provided. The transmit terminal is comprises a transceiver for transmitting and receiving signals to and from a media server; and a controller for transmitting to the media server, identification information relating to at least one counterpart terminal, generate media comprising location information associated with the media, and register the generated media to the media server.

According to another aspect of the present disclosure, a receive terminal for sharing media using a social network is provided. The receive terminal comprises a transceiver for transmitting and receiving signals to and from a media server; and a controller for controlling to transmit to a media server, identification information relating to at least one counterpart terminal, transmit location information of the receive terminal to the media server, and receive from the media server, media corresponding to the location information among media registered by the at least one counterpart terminal.

According to another aspect of the present disclosure, a media server for sharing media between terminals using a social network is provided. The media server comprises a transceiver for transmitting and receiving signals to and from each terminal; and a controller for controlling to receive from each terminal, identification information of at least one counterpart terminal, build a social network for each terminal, receive and register media comprising location information from each terminal, when receiving location information from a particular terminal, search for media corresponding to the location information among media registered by at least one counterpart terminal belonging to a social network of the particular terminal, and to transmit the searched media to the particular terminal.

Other aspects, advantages, and salient features of the invention will become apparent to those skilled in the art from the following detailed description, which, taken in conjunction with the annexed drawings, discloses exemplary embodiments of the invention. Before undertaking the DETAILED DESCRIPTION OF THE INVENTION below, it may be advantageous to set forth definitions of certain words and phrases used throughout this patent document:

the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 to 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification Exemplary embodiments of the present invention provide a method and an apparatus of a terminal for generating and registering media including location information to a media server, and sharing the media between related terminals in a communication system.

Figure 1:
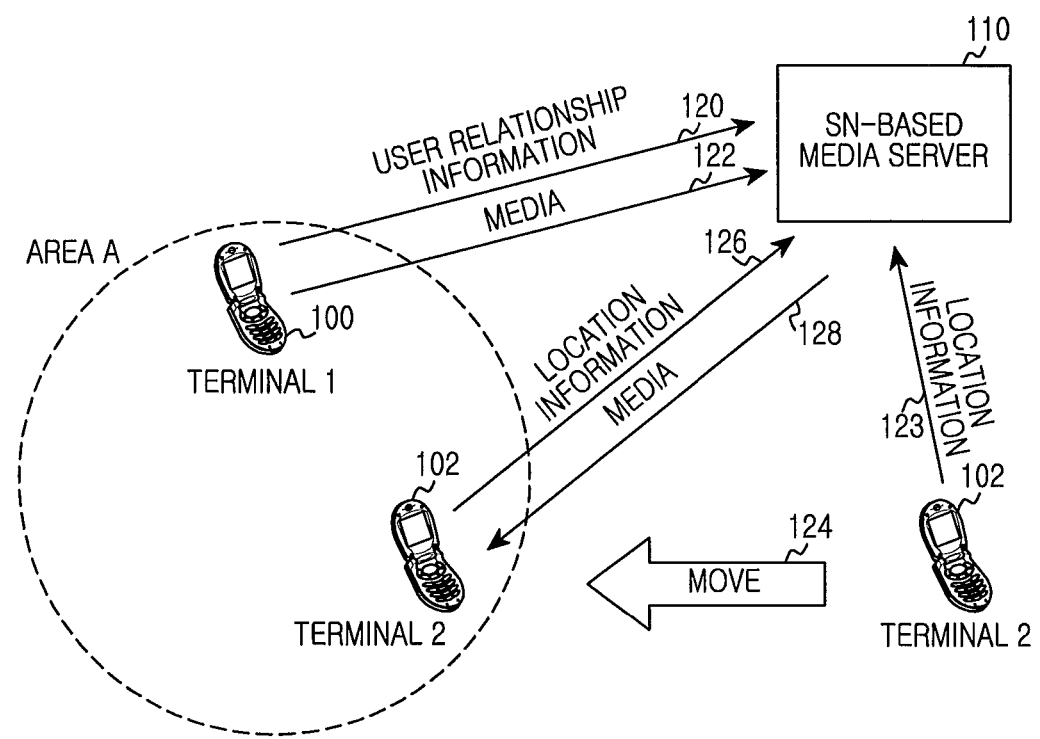
FIG. 1 illustrates an example communication system for sharing media using a social network according to one embodiment of the present disclosure.

FIG. 1 illustrates an example communication system for sharing media using a social network according to one embodiment of the present disclosure. The communication system includes a first terminal 100 that transmits user relationship information indicating relationships with friends, to a Social Network (SN)-based media server 110 in step 120. The user relationship information may include phone numbers of users stored in a phone book of the first terminal 100, and relationships of the users (e.g., friends, family, colleague, etc.). According to user's setting, the first terminal 100 may transmit to the media server 110, user relationship information including only information of users corresponding to a particular relationship. For example, to share media only with family members and friends, the first terminal 100 may transmit only phone numbers and relationship information of the family and the friends to the media server 110. It may be assumed that a user of the first terminal 100 has acquaintance with a user of a second terminal 102 such that the first terminal 100 transmits the phone number and the relationship of the second terminal 102 to the media server 110.

In step 122, the first terminal 100 generates media to share with other terminal(s) and transmits the generated media to the media server 110. The media may include rich media including a set of various media such as audio, image, video, and text, and may include location information, time information, and sensor information. To create the rich media, the first terminal 100 may utilize a protocol, such as a markup language (e.g. Hyper Text Markup Language 5 (HTML5)), or MPEG-4, Part 4 (MP4). Using HTML5, the first terminal 100 may receive at least one medium and location and sensor information of the medium, generate a layout using the HTML5 protocol, and generate one rich media file. Using the MP4 protocol, the first terminal 100 may generate an MP4 file including at least one medium and represent additional information such as location and sensor information for the at least one medium using metadata of the MP4 file.

The SN-based media server 110 builds a social network for the first terminal 100 based on the user relationship information received from the first terminal 100 in the step 120, and stores information of the built social network. Upon receiving the media from the first terminal 100 in the step 122, the SN-based media server 110 registers and stores the media of the first terminal 100.

Meanwhile, according to a user's request or the execution of an Application (App) that may be used for media sharing, the second terminal 102 requests to share the media by transmitting its location information to the media server 110. That is, when the App for the media sharing is executed, the second terminal 102 transmits its location information and identification information to the media server 110 every time the location information is changed due to the movement of step 124 or on a periodic basis, in steps 123 and 126.

The SN-based media server 110 examines whether media registered by terminals of the social network of the second terminal 102 include media corresponding to the location information of the second terminal 102. When detecting the media corresponding to the location information of the second terminal 102, the SN-based media server 110 provides the corresponding media to the second terminal 102. The terminal belonging to the social network of the second terminal 102 represents the terminal having the acquaintance with the second terminal 102. The terminal may be the first terminal 100. In more detail, the media server 110 examines whether the media registered by the first terminal 100 include the media corresponding to the location of the second terminal 102. When detecting the media, the media server 110 transmits the corresponding media to the second terminal 102. Herein, even though the location information in the media registered by the first terminal 100 does not match the location information of the second terminal 102, the media server 110 may determine that the media corresponds to the location of the second terminal 102 when the two location information lie within a threshold range. That is, when the second terminal 102 in an area A transmits the location information to the media server 110 in the step 126, the media server 110 retrieves the media registered by the first terminal 100 in the area A and provides the media to the second terminal 102 in step 128.

Figure 2:
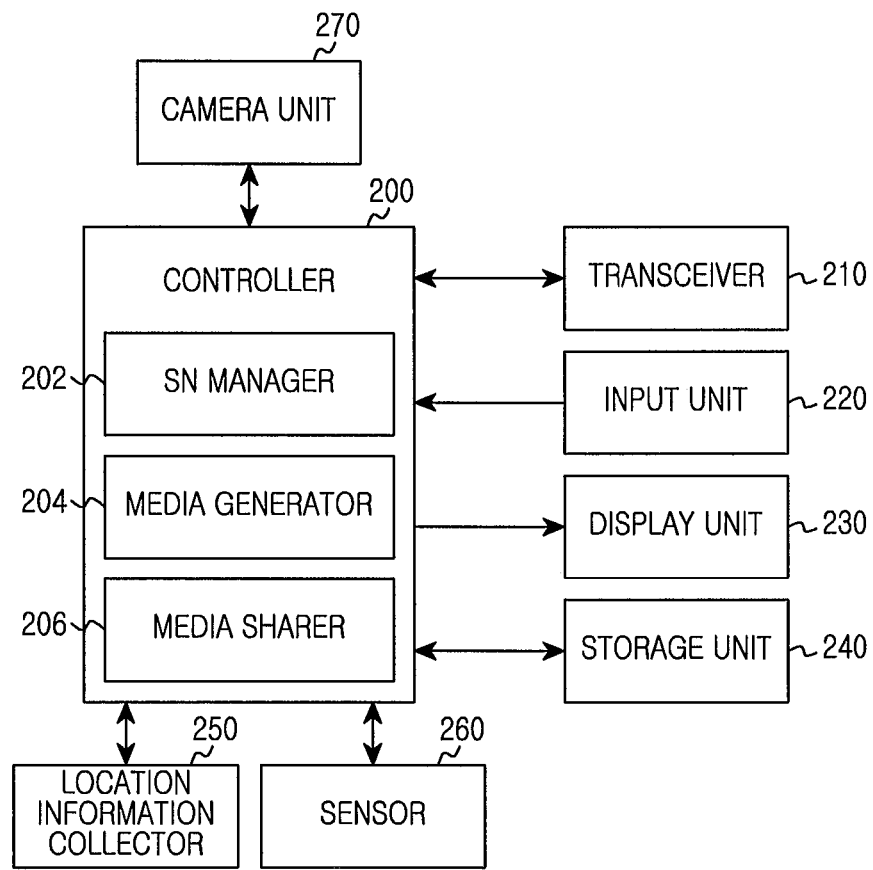
FIG. 2 illustrates an example terminal in the communication system according to one embodiment of the present disclosure.

FIG. 2 illustrates an example terminal that may be used with the communication system according to one embodiment of the present disclosure. The terminal includes a controller 200, a transceiver 210, an input unit 220, a display unit 230, a storage unit 240, a location information collector 250, a sensor 260, and a camera unit 270. The controller 200 includes an SN manager 202, a media generator 204, and a media sharer 206.

The controller 200 controls one or more operations of the terminal. The controller 200, including the SN manager 202, the media generator 204, and the media sharer 206, may perform various functions to share the media with other related terminals.

The SN manager 202 builds the social network for media sharing. In other words, the SN manager 202 may collect the user relationship information indicating the relationships with acquaintances and transmit the collected user relationship information to the media server. The user relationship information may include the phone numbers of the users stored to the phone book of the terminal and the relationship (e.g., friends, family, colleague, etc.) information of the users. According to the user's setting, the SN manager 202 may transmit only information of the users corresponding to a particular relationship to the media server. For example, to share the media only with the family members and the friends, the SN manager 202 may transmit to the media server only the phone numbers and the relationship information of family and friends. If the phone book of the terminal is changed, the SN manager 202 may again collect and transmit the user relationship information to the media server. For example, when an event for registering a new phone number, deleting the registered phone number, or changing the registered phone number occurs, the SN manager 202 may transmit the corresponding user relationship information to the media server.

The media generator 204 generates media to share with other terminals under the user's control. To create the media, the media generator 204 collects and add environment information of the user to the media. More specifically, the media generator 204 collects the location information associated with the media by controlling the location information collector 205, collects environment information detectable by sensors by controlling the sensor 260, and adds the collected location information to the media. The media may be rich media including a set of the media such as audio, image, video, and text information. The media generator 204 may generate the rich media based on a markup language such as HTML5, or the MP4 protocol. To create the rich media based on the HTML5, the media generator 204 may receive media such as audio information, video information, and text information, location information, and sensor information from the user, generate a layout using the HTML5 protocol, and generate one rich media file. To generate rich media based on the MP4 protocol, the media generator 204 may generate an MP4 file including audio information, image information, video information, and text information, and generate one rich media file by adding the location information and the sensor information to a metadata portion of the MP4 file. The rich media file based on the MP4 protocol may be arranged as shown in FIG. 6.

Figure 6:
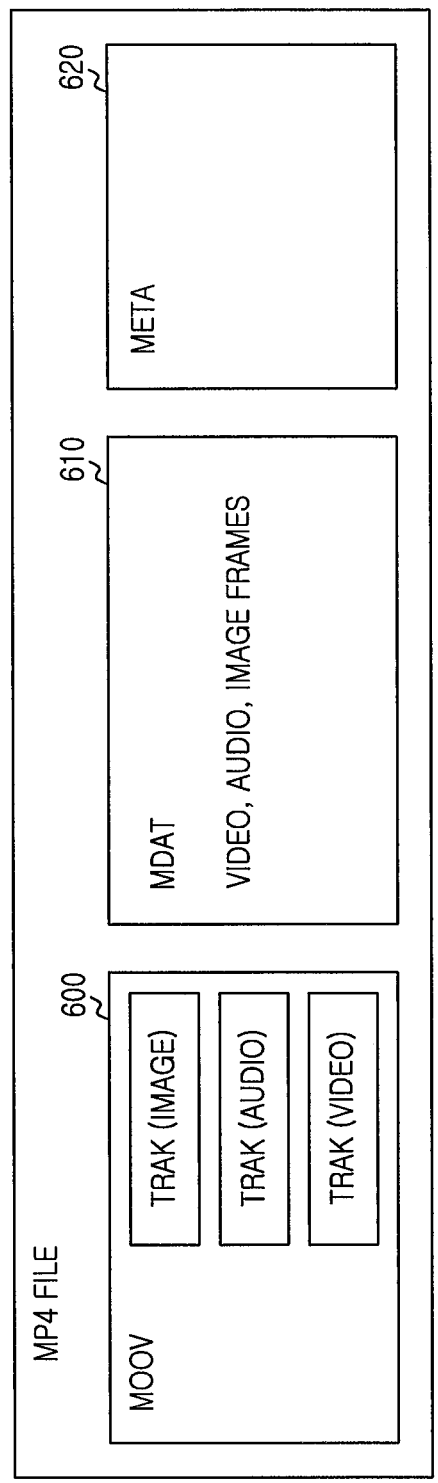
FIG. 6 illustrates an example media file structure in the communication system according to one embodiment of the present disclosure.

Referring to FIG. 6, the MP4 file includes a MOOV container 600 including information used to play the corresponding file, a MDAT container 610 including actual data such as video, audio, and image frames, and a META container 620 including additional information. The META container 620 may be arranged as shown in FIGS. 7 through 10, which shall be explained in detail below.

Since the location and environment information may be changed in the process of the media generation, the media generator 204 may split the generated media into a plurality of segments according to a certain basis and add location information and environment information for each of the split segments.

To share the media with other related terminals, the media sharer 206 transmits the media created by the media generator 204 to the media server. When the user request that media be shared or executes a media sharing App, the media sharer 206 issues a request for the media server to provide the media corresponding to the current location information of the terminal. When the user requests that the media be shared, the media sharer 206 may issue a request that the media server provide the media only at the corresponding time. When the media sharing App is executed, the media sharer 206 may issue a request for the media server to provide the media on the periodic basis or in every location information change. Notably, the media provision request time of the media sharer 206 may vary according to any suitable manner. The media sharer 206 may transmit the current location information and the identification information (e.g., phone number) of the terminal to the media server. Upon receiving the media from the media server, the media sharer 206 informs the user of the media reception, and controls and processes the playing of the received media on the user's terminal.

The transceiver 210 transmits and receives signals under the control of the controller 200. In particular, the transceiver 210 transmits and receives signals to and from the media server for media sharing.

The input unit 220 includes at least one key and a touch sensor, and provides the controller 200 with data corresponding to the key input by the user, data corresponding to the user's touch, or other suitable type of user input mechanism.

The display unit 230 displays status information, numbers, characters, and images generating in the operation of the terminal. Under the control of the controller 200, the display unit 230 displays a message informing of the media reception and displays images generating in the media play.

The storage unit 240 stores programs and data for operating the terminal, and stores the phone numbers and the relationship information of the acquaintances connected to the user. The storage unit 240 may store the generated media under the control of the controller 200 and store the media received from the media server.

The location information collector 250 is controlled by the controller 200 to collect and provide the location information of the terminal to the controller 200. That is, as media is generated, the location information collector 250 may aggregate the location information of the terminal. In one embodiment, the location information collector 250 may include a Global Positioning System (GPS) receiver in which the location information includes latitude and longitude information associated with the location. According to certain embodiments, the location information may include a region name of the corresponding location, such as city or country.

The sensor 260 is controlled by the controller 200 to collect and provide the detectable environment information to the controller 200. The sensor 260 includes diverse sensors for collecting and providing the controller 200 with at least one of orientation, acceleration, brightness, magnetic field, and whether information. For example, the sensor 260 may include various sensors such as a magnetic sensor, an accelerometer, a light sensor, and a temperature sensor.

The camera unit 270 includes a camera sensor for converting an optical signal representing an image to an electric signal, and a signal processor for converting an analog image signal captured by the camera sensor to digital data. To generate the media, under the control of the controller 200, the camera unit 270 takes a photograph, processes the image signal on a frame-by-frame basis, and provides the processed image signal to the controller 200. The camera unit 270 may adjust a zoom level for photographing the image under the control of the controller 200, and provides the adjusted zoom level information to the controller 200.

Figure 3:
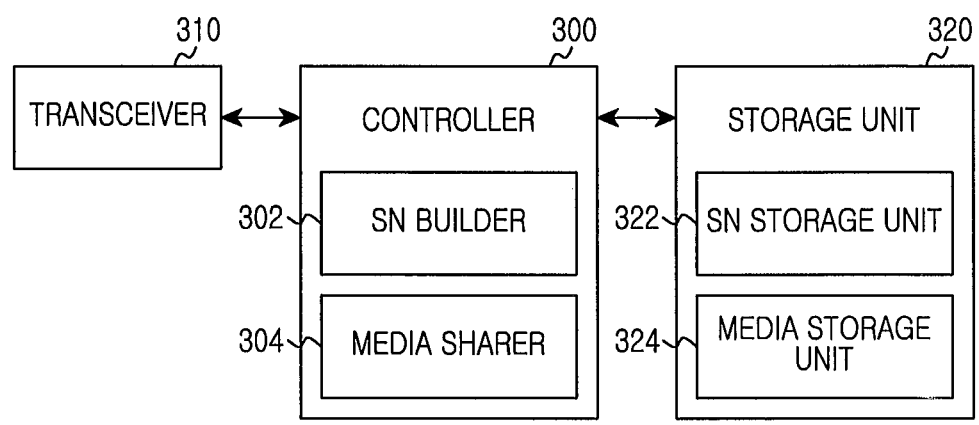
FIG. 3 illustrates an example media server in the communication system according to one embodiment of the present disclosure.

FIG. 3 illustrates an example media server that may be used with the communication system according to one embodiment of the present disclosure. The media server includes a controller 300, a transceiver 310, and a storage unit 320. The controller 300 includes an SN builder 302 and a media sharer 304.

The controller 300 controls and processes operations of the media server. In particular, the controller 300 including the SN builder 302 and the media sharer 304 shares the media among terminals forming the social network. The SN builder 302 receives the user relationship information from the terminal, builds one social network with terminals related to the terminal, and stores information of the built social network to the storage unit 320.

The media sharer 304, upon receiving the media from the terminal, stores the corresponding media as the media for the corresponding terminal. When a particular terminal requests that the media server provide the media corresponding to its location information, the media sharer 304 searches for other terminals belonging to the social network of the particular terminal and examines whether media registered by the searched terminals include the media corresponding to the location information of the particular terminal. When media corresponding to the location information of the particular terminal are found, the media sharer 304 transmits the corresponding media to the particular terminal. When no media corresponding to the location information of the particular terminal are found, the media sharer 304 transmits a signal indicating the absence of any corresponding media. Although the location information of the particular terminal may not be identical to the location information of the media registered by another terminal belonging to the social network of the particular terminal, when the two location information of each of the terminals lie within a threshold range, the media sharer 304 may determine that the corresponding media corresponds to the location of the particular terminal.

The transceiver 310 transmits and receives signals under the control of the controller 300. In particular, the transceiver 310 transmits and receives signals to share the media among the terminals forming the social network.

The storage unit 320 stores executable programs and data required to operate the server. An SN storage unit 322 of the storage unit 320 stores the social network information for each terminal; that is, the phone numbers and the relationship information of the acquaintances related to each terminal under the control of the controller 300. A media storage unit 324 of the storage unit 320 maps and stores the media received from the terminals with the identification information (e.g., phone numbers) of the terminals under the control of the controller 300.

Figure 4:
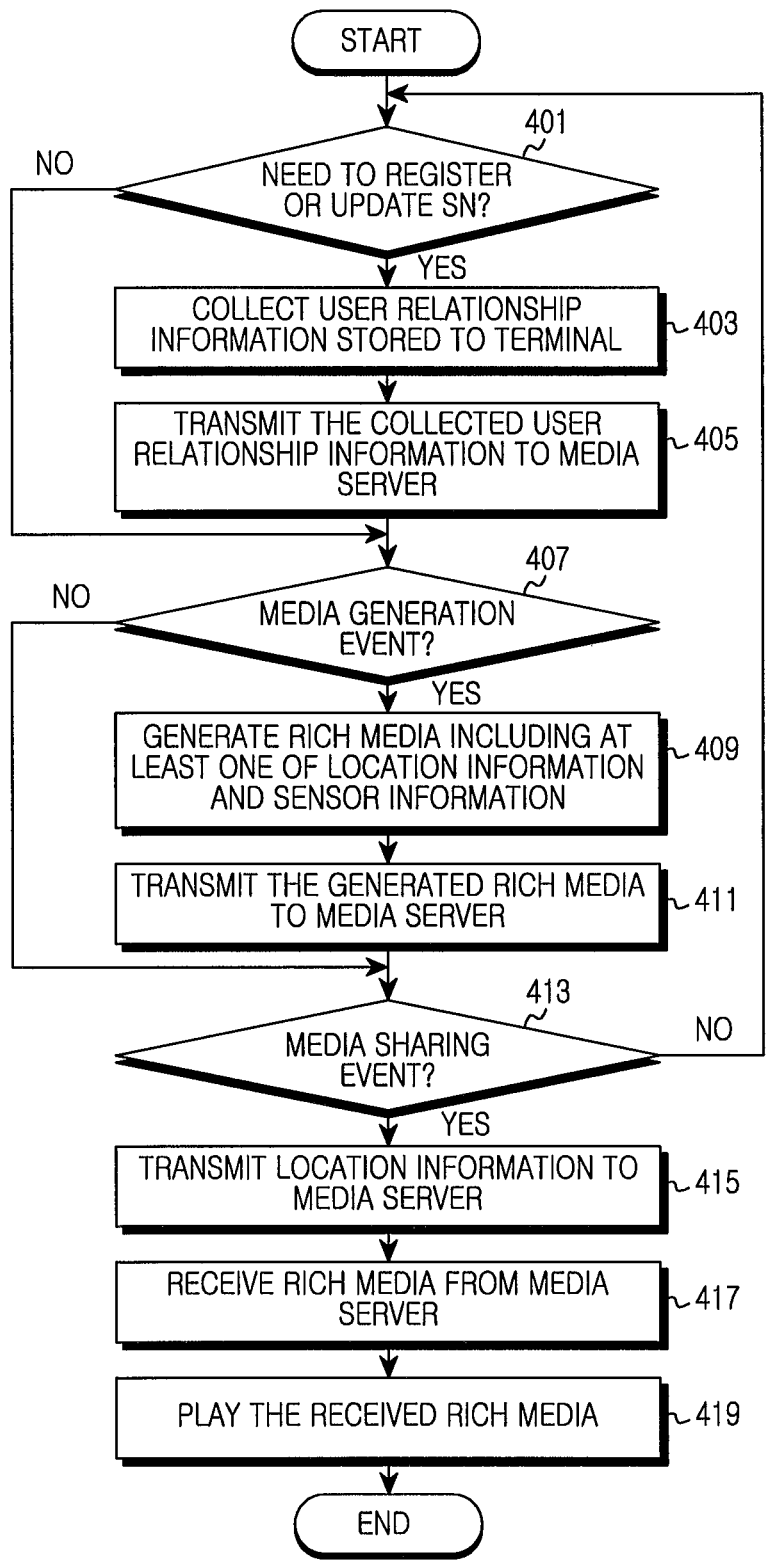
FIG. 4 illustrates an example media sharing method of the terminal in the communication system according to one embodiment of the present disclosure.

FIG. 4 illustrates an example media sharing method of the terminal in the communication system according to one embodiment of the present disclosure. In step 401, the terminal determines whether to register or update the social network. More specifically, at the initial phase when the social network is not established, or when the information of the phone book is changed, the terminal may decide to register or update the social network. When it is determined not to register or update the social network, processing continues at to step 407.

When deciding to register or update the social network, the terminal collects the user relationship information stored to the terminal in step 403 and transmits the collected user relationship information to the media server in step 405. The user relationship information may include the phone numbers of the users stored to the phone book of the terminal and the relationship (e.g., friend, family, colleague, etc.) information of the users. According to the user's setting, the user relationship information may include only the information of the users corresponding to the particular relationship, or only the information of the users whose phone book information is changed. For example, when the user of the terminal wants to share the media solely with the family and the friends, the terminal may transmit only the phone numbers and the relationship information of the family and the friends to the media server. When the event for registering a new phone number, deleting the registered phone number, or changing the registered phone number occurs, the terminal may transmit the relevant user relationship information to the media server.

In step 407, the terminal examines whether a media generation event takes place. The media generation event may directly create image, audio, and video, or select image, audio, and video information that has been previously stored in the terminal. When no media generation event occurs, the process continues at step 413.

By contrast, when a media generation event occurs, the terminal generates rich media including at least one of the location information and the sensor information in step 409 and transmits the generated rich media to the media server at step 411. The location information and the sensor information indicate the location information and the environment information respectively when the corresponding media are generated, and may include the latitude, the longitude, the city, the country, the orientation, the acceleration, the brightness, the magnetic field, the zoom level, the weather information, and the like. The rich media may be generated based on the markup language such as HTML5, or the MP4 protocol. To generate the rich media based on the MP4 protocol, the terminal may generate a MP4 file including audio, image, video, and text information, and add the location information and the sensor information to the metadata container of the MP4 file. The rich media file based on the MP4 protocol may be arranged as shown in FIG. 6, more particularly, as shown in FIGS. 7 through 10 to be explained.

In step 413, the terminal determines whether a media sharing event takes place. That is, the terminal examines whether the user requests to share the media or executes the App for the media sharing. When the media sharing event does not occur, the process continues at step 401.

When the media sharing event occurs, the terminal transmits its current location information to the media server to provide the media corresponding to the location information of the terminal in step 415. When the media sharing App is executed, the terminal may transmit its location information to the media server on the periodic basis or in every change of the location information. In so doing, the terminal transmits the identification information (e.g., the phone number) of the terminal together.

The terminal receives the rich media corresponding to the location information from the media server in step 417, plays the received rich media in step 419, and then finishes this process. Additionally, when the media server does not have the rich media corresponding to the location information of the terminal, the terminal may receive a signal informing of the absence of the media from the media server. At this time, according to the setting, the absence of the media corresponding to the current location may or may not be informed to the user.

Figure 5A:
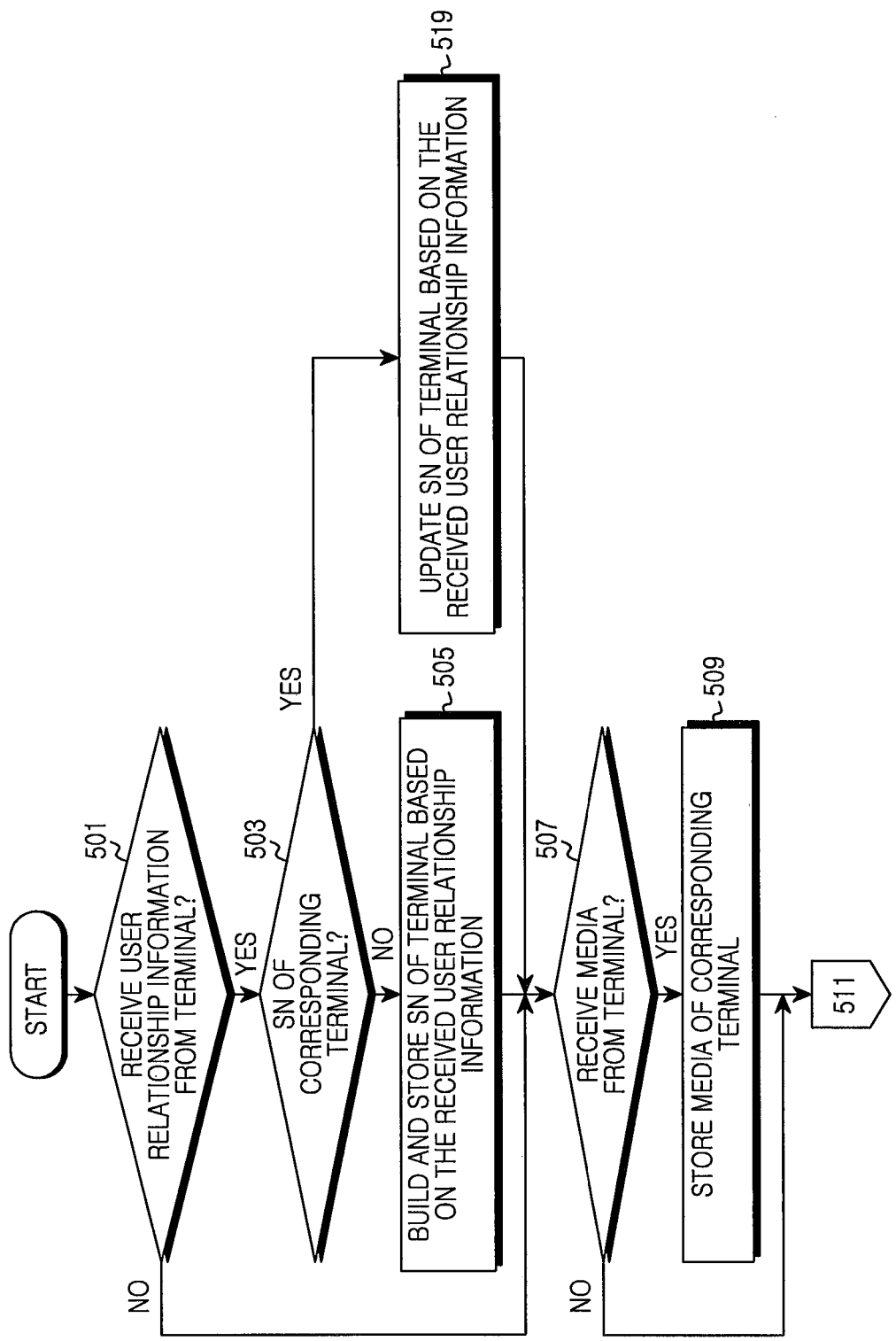
FIGS. 5A and 5B illustrate an example media sharing method of the media server in the communication system according to one embodiment of the present invention.
Figure 5B:
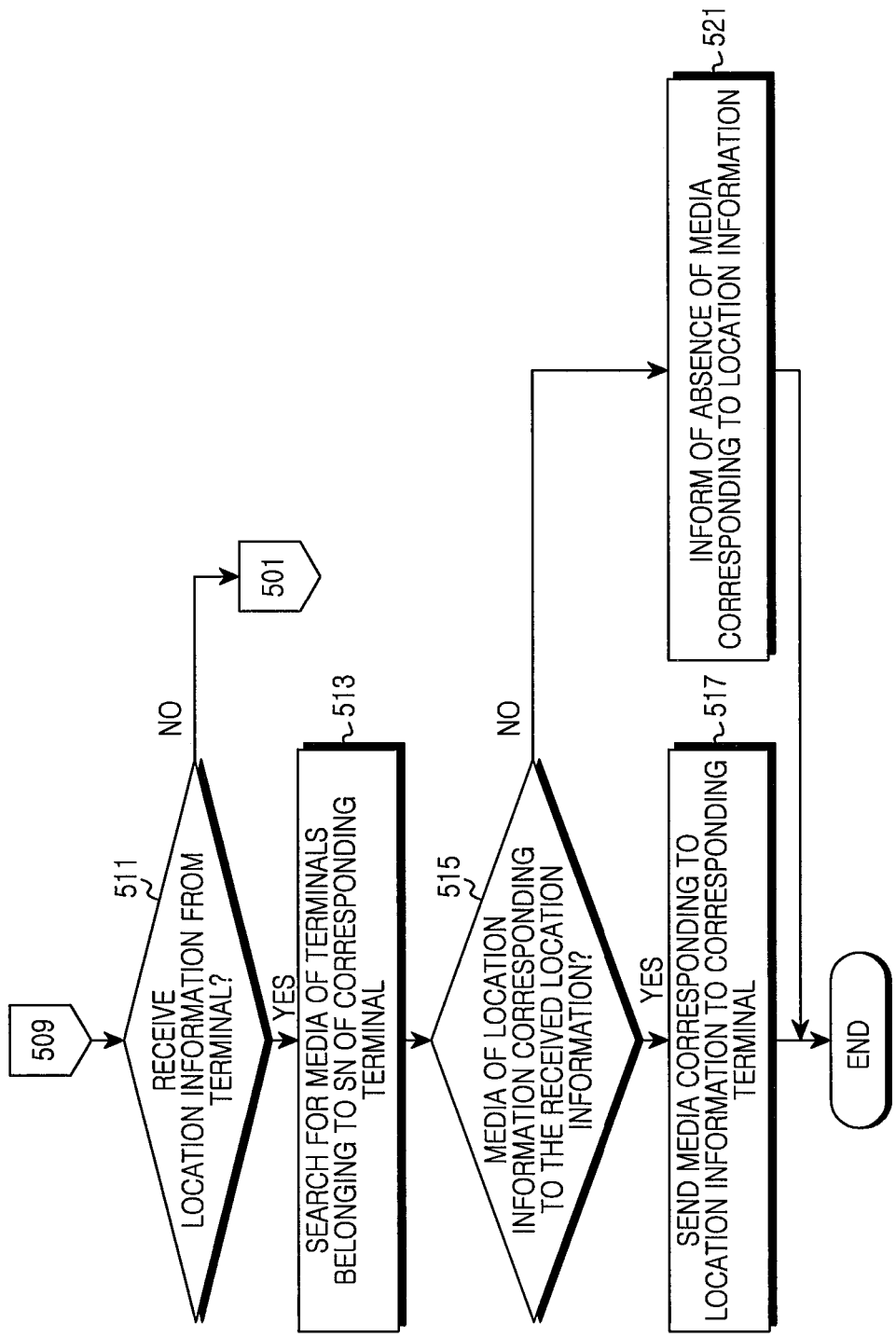

FIGS. 5A and 5B illustrate an example media sharing method of the media server in the communication system according to one embodiment of the present disclosure. The media server determines whether the user relationship information is received from the terminal in step 501. When not receiving the user relationship information from the terminal, the process continues at step 507.

Upon receiving the user relationship information from the terminal, the media server determines whether social network information exists for the corresponding terminal in step 503. When the social network information exists for the corresponding terminal, the media server updates the social network of the terminal based on the received user relationship information in step 519. When the social network information does not exist for the corresponding terminal, the media server builds the social network for the terminal based on the received user relationship information and stores the information in step 505.

In step 507, the media server determines whether the media are received from the terminal Not receiving the media from the terminal, the process continues at step 511. Upon receiving the media from the terminal, the media server registers and stores the media of the corresponding terminal in step 509. In doing so, the media server may map and store the media with the phone number of the terminal.

In step 511, the media server determines whether the location information is received from the terminal. When not receiving the location information from the terminal, the process continues at step 501.

By contrast, upon receiving the location information from the terminal, the media server searches for the media registered by the terminals belonging to the social network of the terminal in step 513, and determines whether the searched media include the media corresponding to the received location information in step 515.

When there are media corresponding to the location information, the media server transmits the media for the location information to the corresponding terminal in step 517 and finishes this process.

When there are no media corresponding to the location information, the media server informs the user of the absence of the media for the corresponding location in step 521 and finishes this process.

Figure 7:
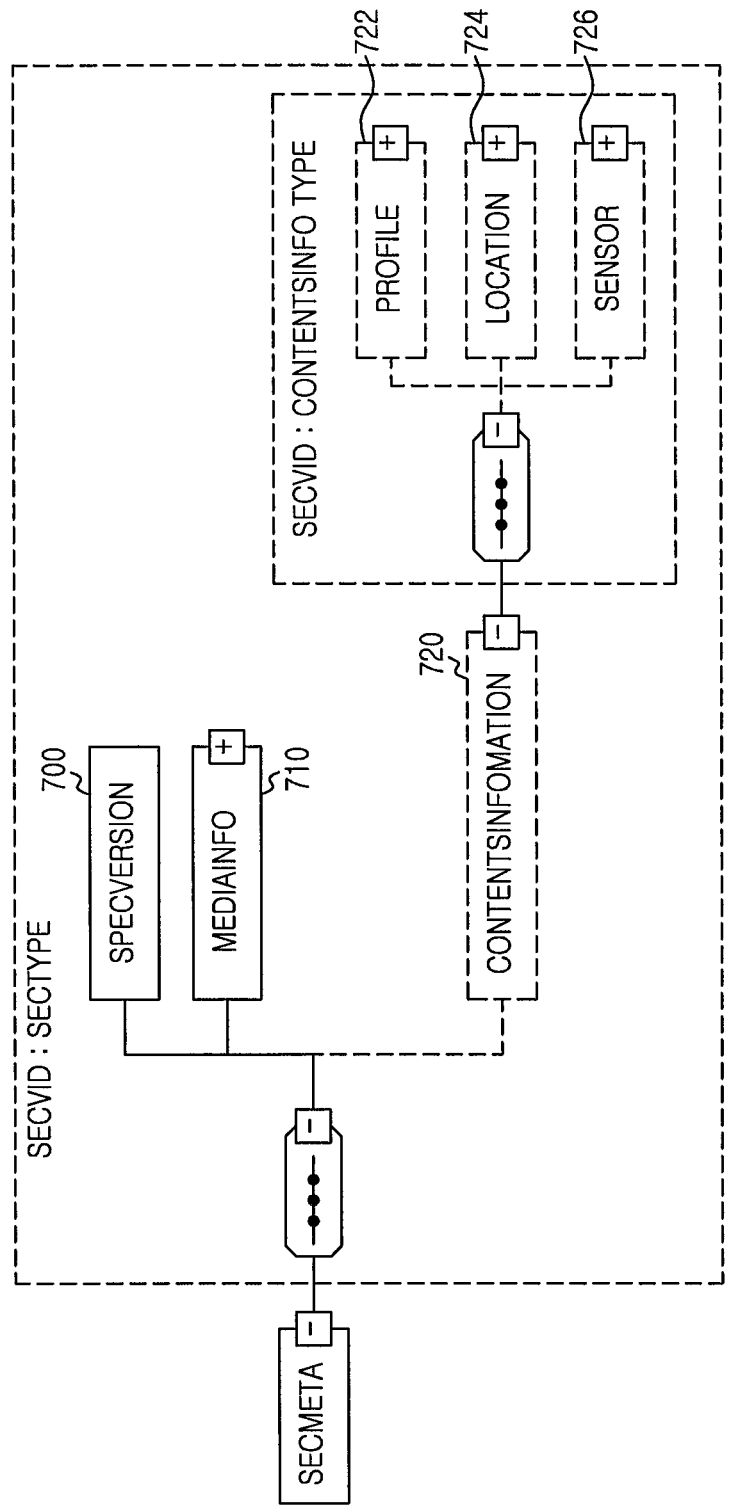
FIG. 7 illustrates an example metadata structure in a media file in the communication system according to one embodiment of the present disclosure.

FIG. 7 depicts an example metadata structure of a media file that may be used with the communication system according to one embodiment of the present disclosure. The media file, in this particular embodiment, includes a META container 620 including SpecVersion element 700, MediaInfo element 710, and ContentsInformation element 720. The SpecVersion elements 700 indicates a version of MP4 specification supported by the corresponding media file, the MediaInfo element 710 indicates information representing additional information of the media file, and the ContentsInformation element 720 indicates additional information for the segments forming the media file. Information marked by a solid line is necessarily carried to a higher node, and information marked by a dotted line is selectively carried to the higher node. In other words, since the MediaInfo element 710 indicates the additional information representing the media file, it is necessarily included in the META container 620. The ContentsInformation element 720, which indicates the information for the segments forming the media file, may not be included in the META container 620 or may be contained as many as the segments forming the media file.

Figure 8:
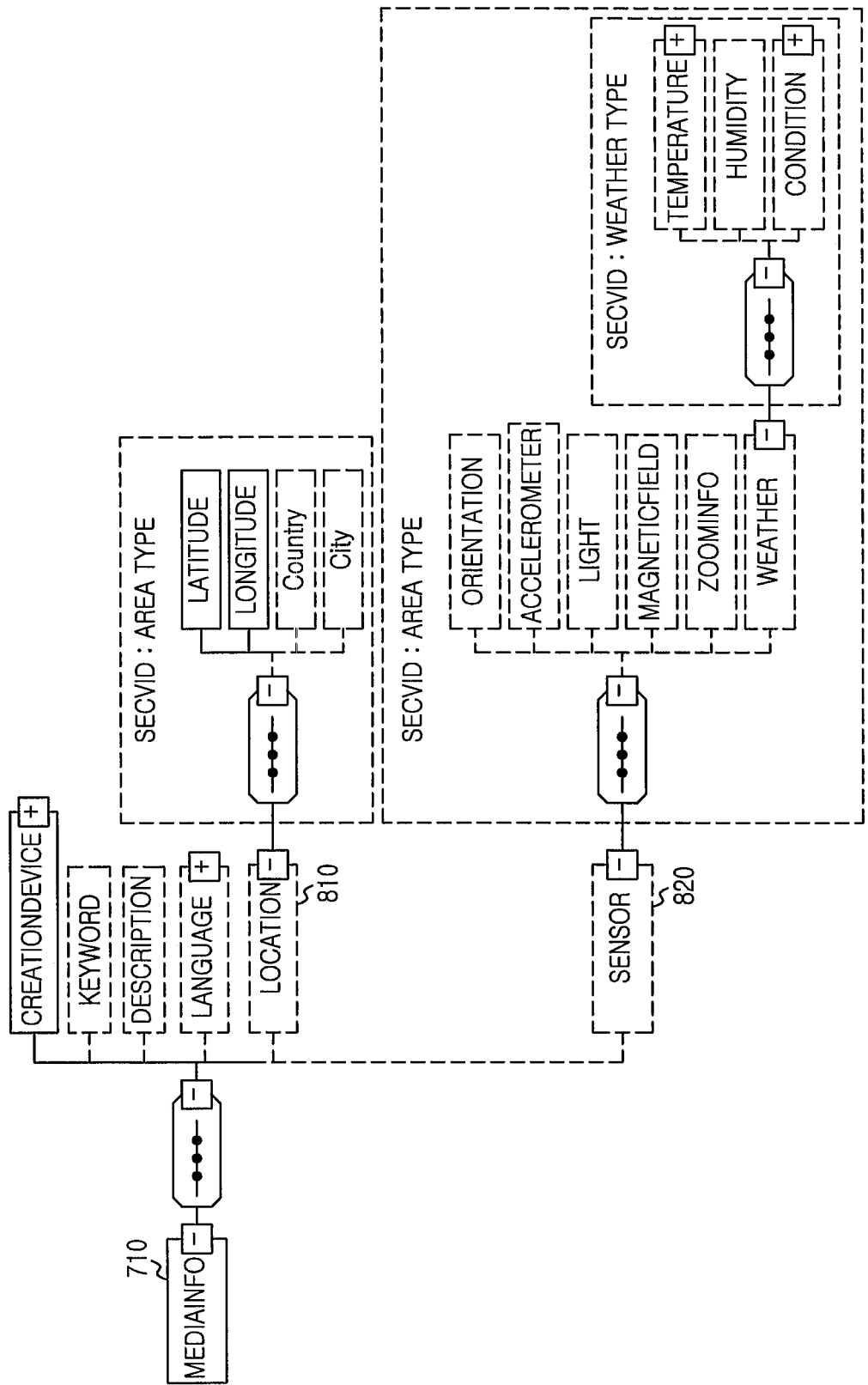
FIG. 8 illustrates an example MediaInfo element of FIG. 7 in detail in the communication system according to one embodiment of the present disclosure.
Figure 9:
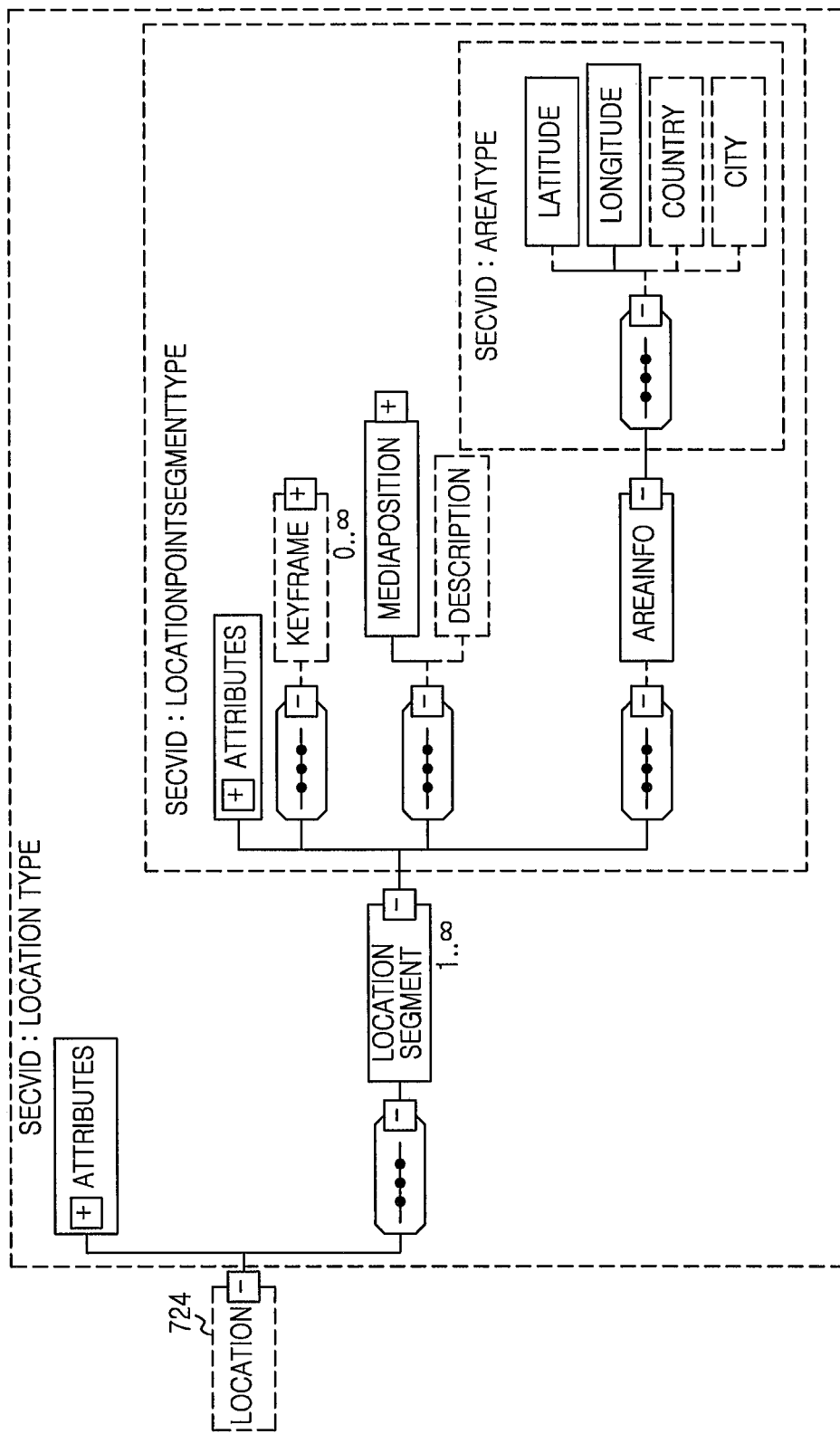
FIG. 9 illustrates an example ContentsInformation element of FIG. 7 in detail in the communication system according to one embodiment of the present disclosure.
Figure 10:
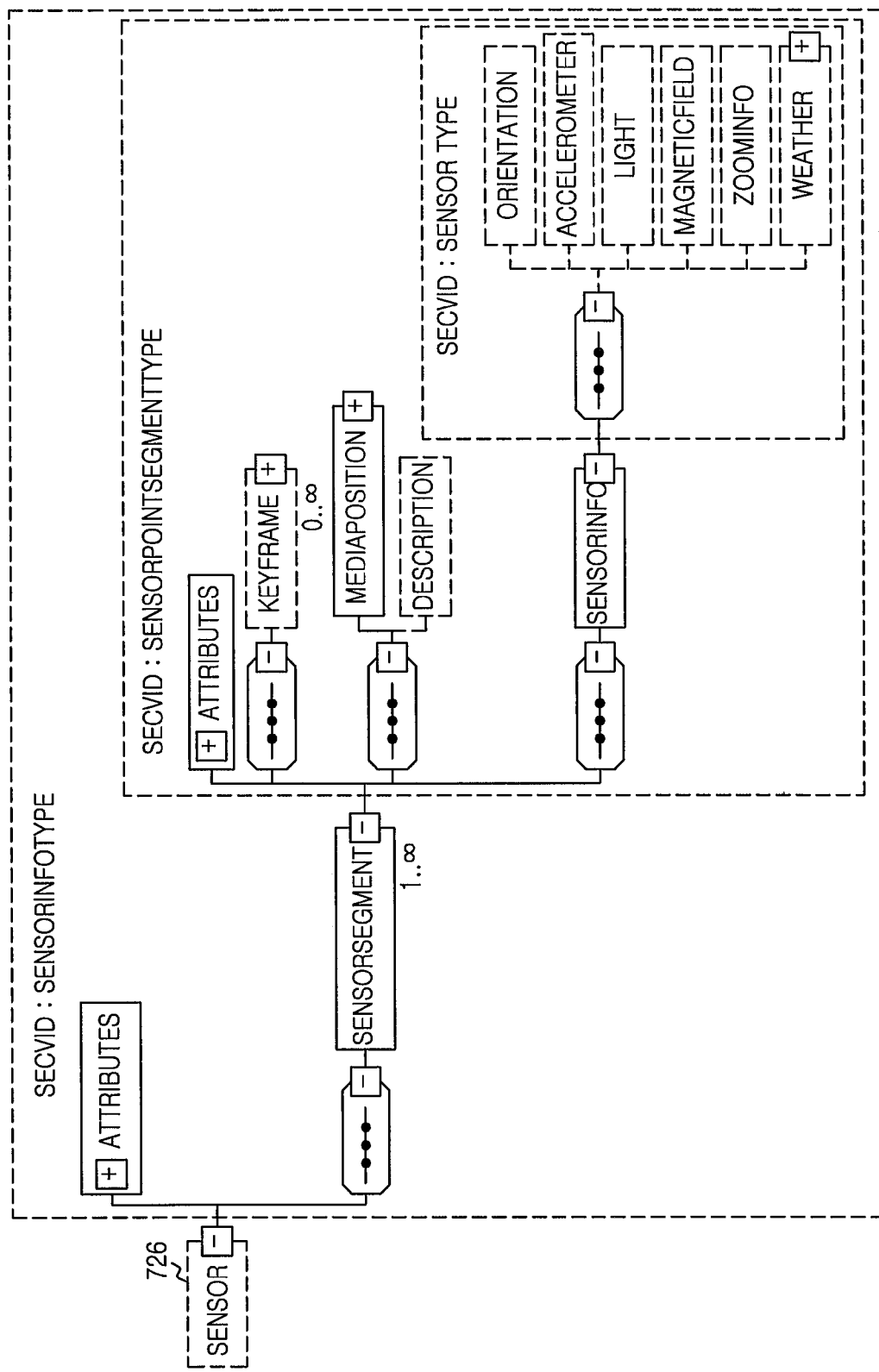
FIG. 10 illustrates an example ContentsInformation element of FIG. 7 in detail in the communication system according to one embodiment of the present disclosure.

Now, detailed structures of the MediaInfo element 710 and the ContentsInformation element 720 of the META container 620 are explained by referring to FIGS. 8, 9 and 10.

FIG. 8 depicts several elements of the MediaInfo element 710 of FIG. 7. The MediaInfo element 710 includes a CreationDevice element which is information relating to the terminal generating the medial file, keyword for the media file, description of the media file, language writing the media file, location 810 when the media file is generated, and sensor 820 detected when the media file is generated. The location 810 and the sensor 820 in the MediaInfo element 710 indicate representative location information of the generated media file, and representative environment information of the generation. For example, since the location information may be changed due to the movement while the terminal creates the media file and the surrounding environment information may be changed while the media file is created, the location 810 and the sensor 820 may be set to representative values. That is, the location 810 and the sensor 820 may be the values representing the location information and the sensor information of the segments as shown in FIGS. 9 and 10. It should be appreciated that the values representing various places and various environments may be determined according to the user's selection or in a predefined manner. The location 810 includes the latitude and the longitude, and may include the region name of the corresponding location, such as city and country according to the design scheme. The sensor 820 may include Orientation, Accelerometer, Light, MagneticField, ZoomInformation, Weather information. The Weather information may include Temperature, Humidity, and Condition information.

The ContentsInformation element 720 of FIG. 7 may include information of Profile 722, Location 724, and Sensor 726 relating to the segments. The Profile 722 indicates the information in the corresponding segment. The Location 724 and the Sensor 726 indicate the location and the environment of the generated segments, which are arranged as shown in FIGS. 9 and 10.

FIG. 9 depicts the Location 724 of the ContentsInformation element 720 in detail, and FIG. 10 depicts the Sensor 726 of the ContentsInformation element 720 in detail.

In FIG. 9, the Location 724 in the ContentsInformation element 720, which indicates the location information of the segments, may include only the location information of one segment or the location information of all of the segments forming the media file. The location information of each segment includes KeyFrame for the corresponding segment, MediaPosition, Description of the corresponding segment, and AreaInfo. The AreaInfo may include the latitude, the longitude, the city, and the country.

In FIG. 10, the Sensor 724 in the ContentsInformation element 720, which indicates the sensor information for the segments, may include only the sensor information for one segment or the sensor information of all of the segments forming the media file. The sensor information for each segment includes KeyFrame for the corresponding segment, MediaPosition, Description of the corresponding segment, and SensorInfo. The SensorInfo may include Orientation, Accelerometer, Light, Magneticfield, ZoomInfo, and Weather.

As shown in FIGS. 7 through 10, the terminal indicates the location information and the sensor information equivalent to the corresponding media file using the META container 620 of the media file and shares the media with the acquaintances using the same. Thus, it is possible to share experiences among the users beyond the mere media sharing, by sharing the media with the acquaintances as above.

For example, when a user A takes pictures and/or video clips in his/her destination, creates rich media including the location information, the environment information obtained through the sensor, the pictures, and the videos, and registers them to the server, the acquaintance of user A who arrives the destination may automatically receive the rich media registered by the user A, see the pictures and the videos of the user A, and concurrently grasp the situation at the point of the picture and video shooting.

When the user A takes pictures in a particular place, creates the rich media by adding the weather when the pictures are taken and the photographing condition (e.g., the zoom information) to the pictures, and registers the rich media to the server, a user B who is the acquaintance of the user A arrives at the particular place and automatically receives the rich media registered by the user A. The user B may obtain the pictures taken by the user A and the photographing condition and refer to them for his/her own photographing.

As set forth above, the terminal in the communication system creates the media including the metadata indicative of the location information and the sensor information and shares the media with other terminals related to the terminal using the metadata. Thus, the media based on the experience of other user is provided unaware to the user and thus the user may feel the pleasure like a gift received. Further, it is possible to provide the media sharing service associated with the life in every area of the user without the spatial limitation, beyond the existing website-based sharing.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in a first terminal, the method comprising:
collecting, when a social network is registered or updated, user relationship information, the user relationship information relating to at least one second terminal sharing at least one media with the first terminal and belonging to the social network of the first terminal;
transmitting, to a media server, the user relationship information to store or update the social network;
generating, when a media generation event occurs, the media from a plurality of segments, the media comprising location information and sensor information of the first terminal when generating the media, wherein the location information and the sensor information for each of the plurality of segments are added to the media;
registering the generated media to the media server;
transmitting, when a media sharing event occurs, location information of the first terminal to the media server;
when the transmitted location information is not within a threshold distance of location information included in at least one media registered by the at least one second terminal, receiving, from the media server, an absence of at least one media corresponding to the transmitted location information;
responsive to moving within a threshold distance of location information included in at least one media registered by the at least one second terminal, receiving automatically, from the media server, at least one media, corresponding to the transmitted location information, of at least one media registered by the at least one second terminal; and
playing the received at least one media;
wherein, when the media comprises an MP4 file that is generated using an MPEG-4, part 4 (MP4) protocol, the location information and the sensor information detectable by a sensor are stored in a metadata portion of the MP4 file.

2. The method of claim 1, wherein the generating the media comprises generating the media using one of a markup language and the MP4 protocol,
wherein the media comprise rich media including at least one of an audio, an image, a video, and a text information.

3. The method of claim 1, wherein the metadata comprises at least one of a version of an MP4 specification supported by the media, information representing additional information of the media, and additional information of segments which constitute the media, the information representing additional information that comprises at least one of information relating to the first terminal that generates the media, a keyword for the media, a description of the media, a language used to write the media, location information associated with where the media is generated, and sensor information indicating an environment after the media is generated, wherein the additional information for the segments comprises at least one of a profile of the segments, location information corresponding to the segments, sensor information indicating an environment corresponding to the segments, a key frame for the segments, a location of the segments in the corresponding media, and a description of the segments.

4. A method in a media server, the method comprising:
receiving, from a first terminal to which a social network is registered or updated, user relationship information relating to at least one second terminal sharing at least one media with the first terminal and belonging to the social network of the first terminal;
storing or updating the social network;
receiving and registering, from the first terminal to which a media generation event occurs, at least one media comprising location information and sensor information of the first terminal when generating the media, the media being formed from a plurality of segments, and wherein the location information and the sensor information for each of the plurality of segments are added to the media;
receiving location information from a second terminal, to which a media sharing event occurs, of the at least one second terminal;
in response to receiving the location information from the second terminal, searching for at least one media being received from the first terminal;
when the received location information of the second terminal is not included in a threshold distance of location information comprised in the searched at least one media, informing an absence of the at least one media corresponding to the received location information of the second terminal; and
when the received location information of the second terminal is within a threshold distance of location information comprised in the searched at least one media, transmitting automatically the searched at least one media to the second terminal;
wherein, when the media comprises an MP4 file that is generated using an MPEG-4, part 4 (MP4) protocol, the location information and the sensor information detectable by a sensor are stored in a metadata portion of the MP4 file.

5. The method of claim 4, wherein the media is generated using one of a markup language and the MP4 protocol, wherein the media comprise rich media including at least one of an audio, an image, a video, and a text information.

6. A first terminal comprising:
a transceiver configured to transmit and receive signals to and from a media server; and
a controller configured to:
collect, when a social network is registered or updated, user relationship information, the user relationship information relating to at least one second terminal sharing at least one media with the first terminal and belonging to the social network of the first terminal,
transmit, to the media server, the user relationship information to store or update the social network,
generate, when a media generation event occurs, media from a plurality of segments, the media comprising location information and sensor information of the first terminal when generating the media, wherein the location information and the sensor information for each of the plurality of segments are added to the media,
register the generated media on the media server,
transmit, when a media sharing event occurs, location information of the first terminal to the media server;
when the transmitted location information does not include within a threshold distance of location information included in at least one media registered by the at least one second terminal, receiving, from the media server, an absence of at least one media corresponding to the transmitted location information;
responsive to moving within a threshold distance of location information included in at least one media registered by the at least one second terminal, receive automatically, from the media server, at least one media, corresponding to the transmitted location information, of at least one media registered by the at least one second terminal; and
play the received at least one media;
wherein, when the media are configured to be generated using an MPEG-4, part 4 (MP4) protocol, the media indicate the location information and the sensor information detectable by a sensor using metadata of an MP4 file.

7. The first terminal of claim 6, wherein the media includes rich media comprising at least one of an audio, an image, a video, and a text, and
the media configured to be generated using one of a markup language and the MP4 protocol.

8. The first terminal of claim 6, wherein the metadata comprise at least one of a version of an MP4 specification supported by the media, information representing additional information of the media, and additional information of segments which constitute the media, the additional information comprising at least one of information relating to a terminal which generates the media, a keyword for the media, description of the media, a language used to write the media, location information associated with where the media are generated, and sensor information indicating an environment associated with after the media is generated, and the segments comprising at least one of a profile of the segments, location information corresponding to the segments, sensor information indicating an environment corresponding to the segments, a key frame for the segments, location of the segments in the corresponding media, and a description of the segments.

9. A media server comprising:
a transceiver configured to transmit or receive signals to and from a first terminal and at least one second terminal; and
a controller configured to:
receive from the first terminal to which a social network is registered or updated, user relationship information relating to the at least one second terminal sharing at least one media with the first terminal and belonging to the social network of the first terminal,
storing or updating the social network,
receiving and registering, from the first terminal to which a media generation event occurs, at least one media comprising location information and sensor information of the first terminal when generating the media, the media being formed from a plurality of segments, and wherein the location information and the sensor information for each of the plurality of segments are added to the media,
after receiving location information from a second terminal, to which a media sharing event occurs, of the at least one second terminal, search for at least one media that is received from the first terminal,
when the received location information of the second terminal it not included in a threshold distance of location information comprised in the searched at least one media, inform an absence of the at least one media corresponding to the received location information of the second terminal, and when the received location information of the second terminal is within a threshold distance of location information comprised in the searched at least one media, automatically transmit the searched at least one media to the second terminal;

wherein, when the media comprise an MP4 file that is generated using an MPEG-4, part 4 (MP4) protocol, the location information and the sensor information detectable by a sensor are stored in a metadata portion of an MP4 file.

10. The media server of claim 9, wherein the media comprise rich media including at least one of an audio, an image, a video, and a text information, and the media configured to be generated using one of a markup language and the MP4 protocol.

* * * * *